(12) United States Patent
Thomson

(10) Patent No.: US 8,931,204 B1
(45) Date of Patent: Jan. 13, 2015

(54) METHOD OF ATTRACTING FISH TO A FISHING SPOON

(76) Inventor: James D. Thomson, Bellevue, OH (US)

( * ) Notice: Subject to any disclaimer, the term of this patent is extended or adjusted under 35 U.S.C. 154(b) by 521 days.

(21) Appl. No.: 13/183,401

(22) Filed: Jul. 14, 2011

(51) Int. Cl.
A01K 85/01 (2006.01)

(52) U.S. Cl.
USPC .......... 43/42.09; 43/17.6; 43/42.06; 43/42.32

(58) Field of Classification Search
USPC .................. 43/17.6, 42.06, 42.09, 42.32
See application file for complete search history.

(56) References Cited

U.S. PATENT DOCUMENTS

| | | | | |
|---|---|---|---|---|
| D138,415 S | * | 8/1944 | Douglass et al. | 43/42.06 |
| 3,169,337 A | * | 2/1965 | McGregor | 43/42.09 |
| 3,221,435 A | * | 12/1965 | St Amant | 43/42.06 |
| 3,434,230 A | * | 3/1969 | Littlefield | 43/42.06 |
| 3,440,755 A | * | 4/1969 | Nahigian | 43/42.06 |
| 3,861,072 A | * | 1/1975 | Holcombe | 43/17.6 |
| 3,863,380 A | * | 2/1975 | Purlia | 43/17.6 |
| 3,895,455 A | * | 7/1975 | Johnston | 43/17.6 |
| 3,921,328 A | * | 11/1975 | Holcombe | 43/17.6 |
| 3,969,840 A | * | 7/1976 | Charron | 43/42.06 |
| 4,581,839 A | * | 4/1986 | Mattison | 43/17.6 |
| 4,589,221 A | * | 5/1986 | Mattison | 43/17.6 |
| 4,610,103 A | * | 9/1986 | Steinman | 43/17.6 |
| 4,649,660 A | * | 3/1987 | Kurka et al. | 43/17.5 |
| 4,672,766 A | * | 6/1987 | Mattison | 43/17.6 |
| 4,693,032 A | * | 9/1987 | Mattison | 43/17.6 |
| 4,700,504 A | * | 10/1987 | Mattison | 43/17.6 |
| 4,709,499 A | * | 12/1987 | Ottaviano | 43/17.6 |
| 4,751,788 A | * | 6/1988 | Mattison | 43/17.6 |
| 4,777,756 A | * | 10/1988 | Mattison | 43/17.6 |
| 4,800,670 A | * | 1/1989 | Mattison | 43/17.6 |
| 4,839,983 A | * | 6/1989 | Pippert | 43/42.06 |
| 4,879,831 A | * | 11/1989 | Herrlich | 43/17.6 |
| 6,108,960 A | * | 8/2000 | Sylla et al. | 43/17.6 |
| 6,195,929 B1 | * | 3/2001 | Sylla et al. | 43/17.6 |
| 6,209,254 B1 | * | 4/2001 | Sylla et al. | 43/17.6 |
| 6,226,917 B1 | * | 5/2001 | Sylla et al. | 43/17.6 |

FOREIGN PATENT DOCUMENTS

| | | | | |
|---|---|---|---|---|
| DE | 3718968 A1 | * | 12/1988 | A01K 85/01 |
| DE | 19928209 A1 | * | 12/2000 | A01K 85/01 |
| JP | 2003047369 A | * | 2/2003 | A01K 85/01 |
| JP | 2005065668 A | * | 3/2005 | A01K 85/01 |
| JP | 2012029621 A | * | 2/2012 | A01K 85/01 |
| JP | 2012231802 A | * | 11/2012 | A01K 85/01 |

* cited by examiner

Primary Examiner — Darren W Ark
(74) Attorney, Agent, or Firm — Jerry Semer

(57) ABSTRACT

A means and apparatus are provided for attracting fish to a Lure that uses at least one of a color of light or at least one of a type of Scent or at least one of a color as the attractant. The Scent would have the added benefit of being made of at least one of a color. Thereby affording anglers an innovative, adaptable, and more affordable type Lure.

4 Claims, 5 Drawing Sheets

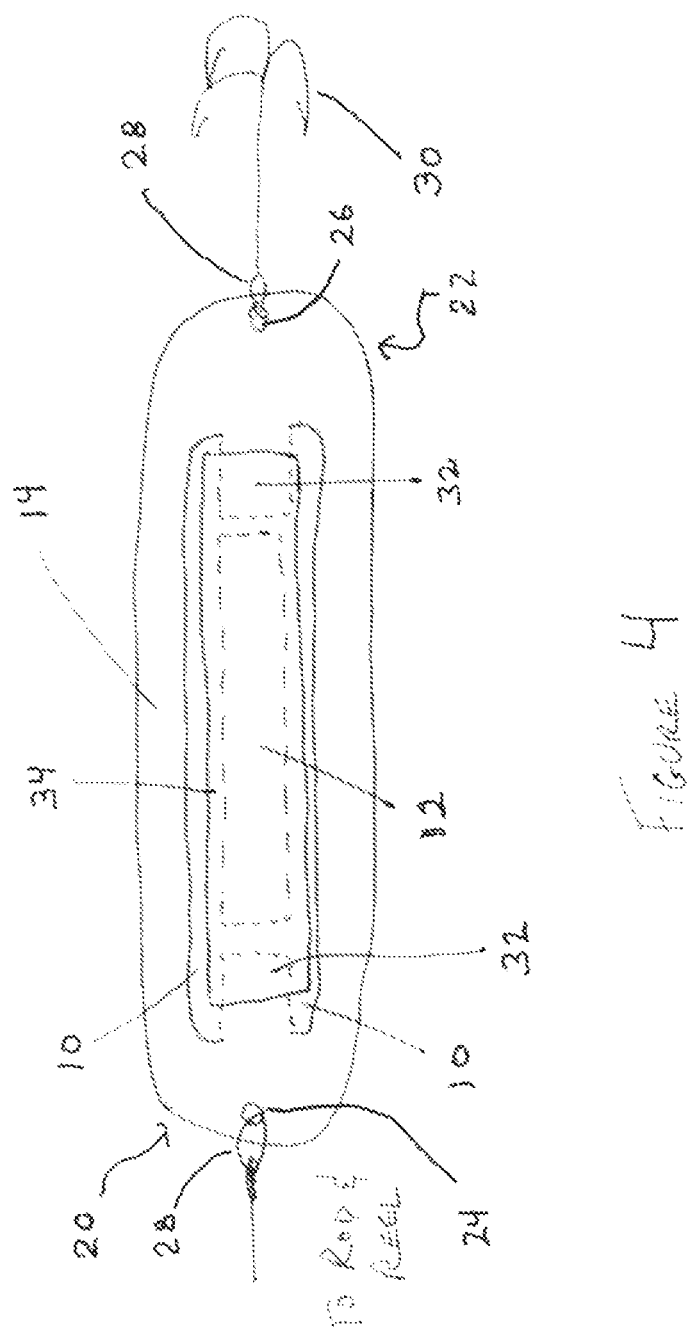

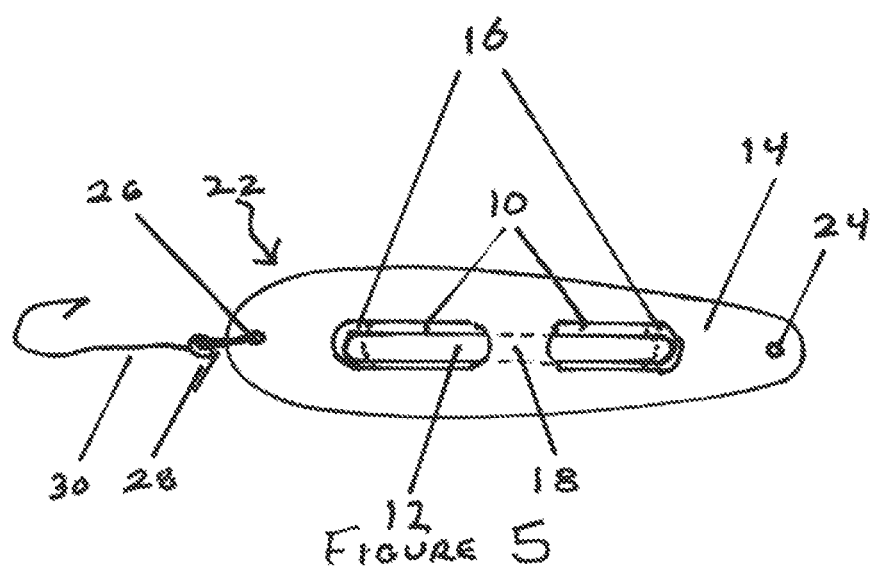

METHOD OF ATTRACTING FISH TO A FISHING SPOON

FIELD OF THE INVENTION

This invention relates to a means of attracting fish to a fishing lure and more particularly to a means for affixing a chemical light or a scent or insertable color stick to (fishing) spoon, for the purpose of attracting and catching a variety of species of freshwater and saltwater fish.

BACKGROUND OF THE INVENTION

For centuries, fishermen have used a variety of different methods to attract both freshwater and saltwater fish to their fishing lure(s) and/or or baited fish hooks. It is to be appreciated that fishing lures vary greatly in appearance, size, shape and composition and color and can be constructed from a single or multiple components.

It is well known within the sport-fishing industry that light attracts fish. To that end, lures have been painted or coated with reflective material or made of material that has been highly polished to a reflective finish.

More recently, lures have been manufactured with highly reflective, holographic material affixed to or impregnated within a lure. The basic principle of these lures being their ability to reflect light and thus attract fish to the lure.

However, these lures have some basic limitations. The first being that the ambient sunlight or moonlight penetrating the surface of the water is diminished as the depth from the surface increases. Another problem is the clarity of the water. If the water is unclear or muddy, penetration of natural light into the water is diminished even greater. This is also true of natural light on cloudy days, during inclement weather conditions and moonless nights.

It is also well recognized within the sport-fishing industry that both freshwater and saltwater fish are attracted by scent in the water. It has been proven that sharks can detect blood in the water from many miles away.

While there are scents specifically designed for use with lures, they are commonly in the form of spray on liquids, aerosols and gels. These means of applying a scent to a lure have proven to be impractical because they are messy; and are not cost effective. Moreover, they are difficult to apply to a lure while standing on a rolling deck.

Other scents are attached to the lure or are positioned ahead of the lure; these scents adversely affect the lure's action.

Finally, it is a well-established fact in the sport-fishing industry that certain colors attract fish on certain days or in certain water conditions or light conditions. Anglers traditionally carry a variety of different colors of the same type lure in their tackle box. These Lures not only are of a variety of colors, they are made of reflective material or made of material that has been highly polished to a reflective finish.

SUMMARY OF THE INVENTION

In its preferred embodiment, this invention has created practical and economical means of affixing a chemical light stick; a scent stick, that is comprised of a at least one of a type of fish attracting scent; or a color stick that is made of or coated with at least one of a color, which may also be made of a reflective material or made of material that has been highly polished to a reflective finish (hereinafter referred to, both jointly and severally as "Attractant Stick") to a (fishing) spoon (hereinafter "Lure"), which in this instance could be a spoon, a blade, a spinner, a flasher, or a dodger.

This invention is a modification of a Lure (i.e., spoon), the basic design of which has not changed since its inception, that allows an Attractant Stick to be temporarily affixed a Lure, by means of mechanically interlocking to the main body of the Lure. The Attractant Stick is securely held in place, yet is easily interchangeable or replaceable.

Attractant Sticks for this invention are cylindrical shape and vary in diameter and length.

Chemical lights for this invention come in a variety of colors of light.

Fish attracting scent for this invention are sticks similar in form to chemical lights and in addition to being available in a variety of scents could be manufactured in a variety of colors and could be florescent or non-florescent color. The fish attracting scent for this invention would also be manufacture from an environmentally safe, biodegradable material.

Color sticks for this invention would also be manufactured in a form similar to a chemical light and would be made of or coated with at least one of a color, which may also be made of a holographic or reflective material or made of material that has been highly polished, reflective finish.

In the preferred embodiment this invention, the Lure has a cavity that accommodates an Attractant Stick, which runs along the centerline of the main body that does not adversely affect the performance of the Lure when it is being retrieved or trolled through water. At each end of the cavity is a portion of the main body of the Lure that is cupped towards the bottom of the Lure to accommodate an Attractant Stick. The cupped portions are slightly wider than the radius of the Attractant Stick.

In the middle of the cavity is a strap of the main body of the Lure, which arches towards the top of the Lure to accommodate an Attractant Stick and is slightly wider than the radius of the Attractant Stick. The purpose of this strap is to cradle the Attractant Stick and hold it securely in place. The strap opposes the cupped ends at each end of the cavity. The cupped ends of the cavity and the middle strap could be reversed in their relationship to the top and bottom of the Lure and the middle strap. The number of straps could vary, based upon the size of the Lure and the size of the Attractant Stick and would vary as to their locations relative to the cupped portions of the main body of the Lure.

In a second embodiment, this invention has a cavity which runs along the centerline of the main body. Each end of the cavity has prong (but it could be a tab or some other form) that is narrower than the wide of the cavity and allows for a clear or opaque tube of semi-rigid material (e.g., surgical tubing) that encapsulates the Attractant Stick. The tabs are inserted into each end of the tube, thereby holding the Attractant Stick securely in place. The tube may have perforations in its outer wall, allowing a scent stick to come in contact with the water surrounding the Lure.

This invention, by incorporating an Attractant Stick with a Lure, offers anglers the ability to better attract fish to their Lure and offers several advantages over traditional Lures. Among the advantages are:

Chemical lights maximize the Lures effectiveness under water, even the most adverse conditions. Furthermore, the incorporation of different colors of light with a Lure provides anglers with an economical means to change the appearance of their Lure without the need to purchase more than one of the same Lure, but in a different color. Thereby, offering anglers a more practical and efficient way to better attract fish to the Lure.

This is also true as it relates to offering anglers different scent sticks in a variety of colors and scents; and Color sticks offer an angler the ability to change the color of the Lure, instead of having to purchase the same Lure in a variety of colors.

One other advantage of this invention is that the cavity, whether filled with an Attractant Stick or not creates a vibration that attracts fish when the Lure is retrieved or trolled through the water.

BRIEF DESCRIPTION OF THE DRAWINGS

FIG. 4 is a top view of the second embodiment of this invention with an Attractant Stick.

FIG. 5 is a top view of the preferred embodiment of this invention with an Attractant Stick.

DETAILED DESCRIPTION OF THE PREFERRED EMBODIMENT

Figure 1A:
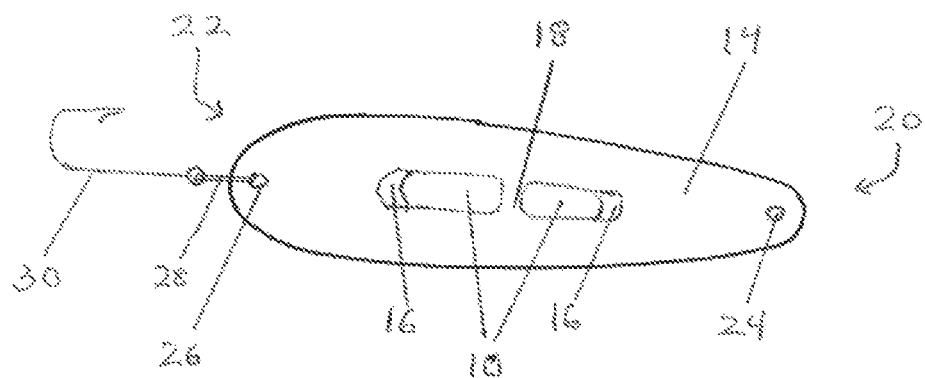
FIG. 1a is a top view of the preferred embodiment of this invention.

FIG. 1 is a top view of the preferred embodiment of this invention that shows a cavity 10 that accommodates the Attractant Stick 12, which runs along the centerline of the main body 14 of the Lure that does not adversely affect the performance of the lure when it is being retrieved or trolled through water. At each end of the cavity 10, are portions of the main body 14 of the Lure that are cupped 16. These cups 16 are arched towards the bottom of the Lure and accommodate the Attractant Stick 12. The cupped 16 portions are slightly wider than the radius of the Attractant Stick 12. In the middle of the cavity 10 is a middle strap 18 which is a portion of the main body 14 of the Lure, which is arched towards the top of the main body 14 and accommodates the Attractant Stick 12. However, the middle strap 18 and cups 16 could be placed on opposite sides of the Lure. This strap 18 is slightly wider than the radius of the Attractant Stick 12. The purpose of this strap 18 is to hold the Attractant Stick 12 securely in place. The strap 18 opposes the cups 16 at each end of the cavity 10 that cradle the Attractant Stick 12. This drawing shows the front end 20 of the main body 14; the trailing end 22 of the main body 14; the hole at the front end 24 (which is used to attach the main body 14 to a fishing line, either directly or by means of a swivel, snap or eye ring); the hole at the trailing end 26 of the main body 14, which accommodates an split ring 28 and a type of the hook 30.

Figure 1B:
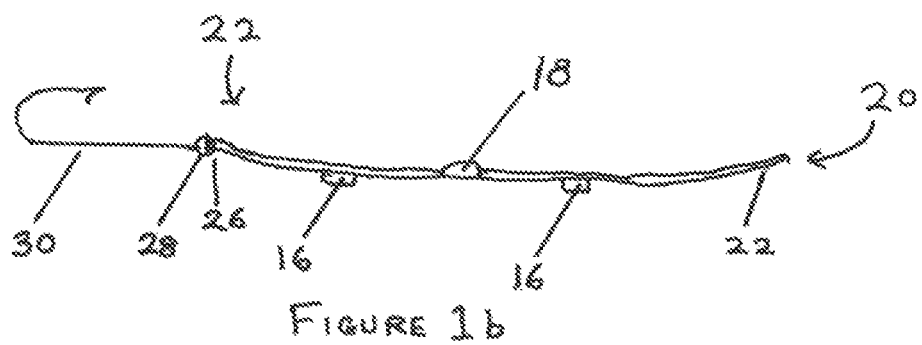
FIG. 1b is a side view of the preferred embodiment of this invention.

FIG. 1b is a side view of the preferred embodiment of this invention, showing the cups 16 at the ends the cavity 10 and the middle strap 18 that is used to hold an Attractant Stick 12 in place, while being trolled or retrieved through the water.

Figure 2A:
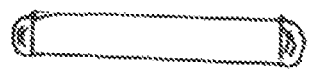
FIG. 2a is a side view of a chemical light stick.) (i.e,. Attractant Stick) 12

FIG. 2a is a side view of a chemical light (i.e., Attractant Stick) 12.

Figure 2B:
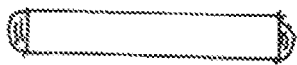
FIG. 2b is a side view of a scent stick. )(i.e., Attractant Stick) 12

FIG. 2b is a side view of a scent stick (i.e., Attractant Stick) 12.

Figure 2C:
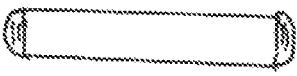
FIG. 2c is a side view of a scent stick.)(i.e., Attractant Stick) 12

FIG. 2c is a side view of a color stick (i.e., Attractant Stick) 12.

Figure 3A:
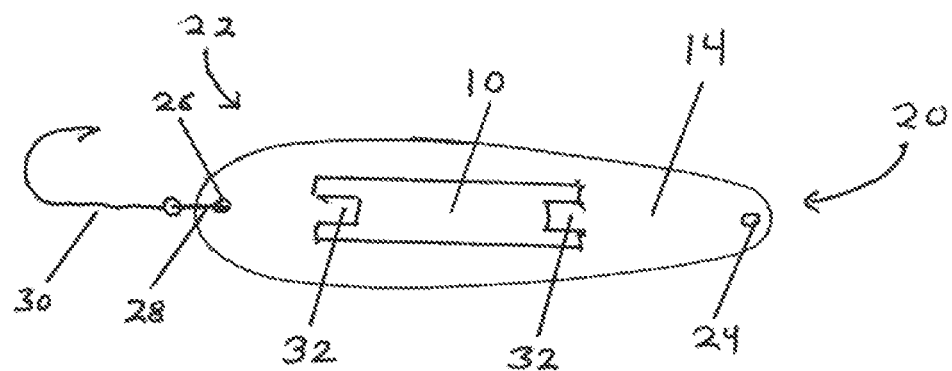
FIG. 3a is a top view of the second embodiment of this invention.
Figure 3B:
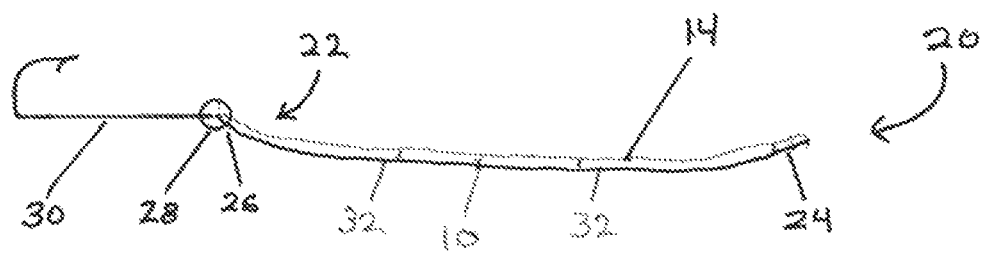
FIG. 3b is a side view of the second embodiment of this invention.

FIG. 3a is a top view of the second embodiment of this invention, showing the main body 14 and the cavity 10 running along the centerline of the main body 14. At each end of the cavity 10 are prongs 32 that are narrower than the cavity 10 and are used to secure a semi-rigid tubing 34. The tubing 34 encapsulates an Attractant Stick 12, which is inserted into each end of the tubing 34, thereby holding the Attractant Stick 12 securely in place, while being trolled or retrieved through the water.

FIG. 4 is a top view of the second embodiment in this invention with one of a type of Attractant Stick 12 encapsulated within a semi-rigid piece of tubing 34.

FIG. 5 is a top view of the preferred embodiment of this invention with an Attractant Stick.

Changes and modifications in the specifically described in the embodiments can be carried out without departing from the scope of this invention, which is intended to be limited only by the scope of the appending claims.

I claim:

1. A fishing lure comprising:
   a. a main body with a top and bottom;
   b. an interchangeable attractant stick with two ends;
   c. a cavity with a middle in the main body that releasably holds the interchangeable attractant stick;
   d. said cavity is an oblong opening with two ends in the main body defining a length therebetween;
   e. a cup with an open side and a bottom side at each end of the two ends of the oblong opening and said cup arches away only from the bottom of the main body;
   f. the interchangeable attractant stick ends fit within the cups;
   g. one strap that extends over the middle of the cavity and that arches away only from the top of the main body and said strap extends over the interchangeable attractant stick when the attractant stick is in place within the cups, said one strap consists of the only strap extending over the middle of the cavity, and said one strap is spaced from each of said cups along the length of said oblong opening;
   h. the interchangeable attractant stick is chosen from a group comprising chemical lights, fish attracting scents, colors and reflective colors; and,
   i. the interchangeable attractant stick within the cavity does not adversely affect the performance of the main body of the lure as the lure is being retrieved or trolled through water.

2. A fishing lure, as in claim 1, wherein:
   a. the interchangeable attractant stick is cylindrical in shape and fits within the cavity and is slightly narrower and shorter in length than the cavity.

3. A fishing lure, as in claim 1, wherein:
   a. the interchangeable attractant stick is further comprised of or coated with an additional substance chosen from a group comprising fish attracting scents, colors and reflective colors.

4. A fishing lure, as in claim 3, wherein:
   a. the interchangeable attractant stick that is comprised of a fish attracting scent and which is further comprised of or coated with a color.

* * * * *